United States Patent
Choi (10) Patent No.: US 11,193,582 B2
(45) Date of Patent: Dec. 7, 2021

(54) CONTROLLING APPARATUS AND METHOD FOR ELECTRIC SHIFT-BY-WIRE SYSTEM

(71) Applicant: Hyundai Kefico Corporation, Gunpo-si (KR)

(72) Inventor: Seung Man Choi, Gunpo-si (KR)

(73) Assignee: Hyundai Kefico Corporation, Gunpo-si (KR)

( * ) Notice: Subject to any disclaimer, the term of this patent is extended or adjusted under 35 U.S.C. 154(b) by 0 days.

(21) Appl. No.: 17/110,098

(22) Filed: Dec. 2, 2020

(65) Prior Publication Data

US 2021/0180689 A1   Jun. 17, 2021

(30) Foreign Application Priority Data

Dec. 13, 2019   (KR) .......................... 10-2019-0166492

(51) Int. Cl.
*F16H 61/32* (2006.01)
*F16H 61/12* (2010.01)
*F16H 61/16* (2006.01)

(52) U.S. Cl.
CPC ............. *F16H 61/32* (2013.01); *F16H 61/12* (2013.01); *F16H 61/16* (2013.01); *F16H 2061/124* (2013.01); *F16H 2061/326* (2013.01)

(58) Field of Classification Search
CPC .......... F16H 61/32; F16H 61/12; F16H 61/16; F16H 2061/124; F16H 2061/326
See application file for complete search history.

(56) References Cited

U.S. PATENT DOCUMENTS

| | | | | |
|---|---|---|---|---|
| 5,085,106 A * | 2/1992 | Bubnash | ................. | B60R 25/06 74/335 |
| 7,946,957 B2 * | 5/2011 | Kimura | ............... | F16H 63/3416 477/111 |
| 8,146,454 B2 * | 4/2012 | Ito | ........................... | F16H 61/32 74/473.1 |
| 8,560,193 B2 * | 10/2013 | Krishnaswami | ........ | F16H 61/32 701/62 |
| 8,725,343 B2 * | 5/2014 | Shimizu | .................. | F16H 61/12 701/29.1 |
| 8,914,185 B2 * | 12/2014 | Ueno | ...................... | F16H 61/12 701/29.2 |
| 9,366,339 B2 * | 6/2016 | Kamada | .................. | H02P 29/62 |

(Continued)

FOREIGN PATENT DOCUMENTS

JP   2005-159143 A   6/2005
JP   2007078018 A    3/2007

(Continued)

*Primary Examiner* — David M Fenstermacher
(74) *Attorney, Agent, or Firm* — Morgan, Lewis & Bockius LLP (57) ABSTRACT

A controlling apparatus for an electric shift-by-wire system is disclosed. The apparatus includes a shift stage sensor detecting information on a target shift stage according to the operation of the shift lever; a position sensor detecting information on a position of the motor; and a controller configured to receive the detected information from the shift stage sensor and the position sensor, when the target shift stage is a P stage, determine whether the P stage is likely to be released using the position information of the motor, and when it is determined that the P stage is likely to be released, limit rotation of the motor.

10 Claims, 6 Drawing Sheets

(56) References Cited

U.S. PATENT DOCUMENTS

| | | | | |
|---|---|---|---|---|
| 10,794,479 B2* | 10/2020 | Kamio | | F16H 59/08 |
| 10,830,344 B1* | 11/2020 | Sakaguchi | | F16H 61/32 |
| 11,125,324 B2* | 9/2021 | Sakaguchi | | F16H 61/12 |
| 2002/0115527 A1* | 8/2002 | Miyata | | F16H 63/483 |
| | | | | 477/34 |
| 2003/0041683 A1* | 3/2003 | Jager | | F16H 61/32 |
| | | | | 74/335 |
| 2004/0018907 A1* | 1/2004 | Tsuzuki | | F16H 59/08 |
| | | | | 475/132 |
| 2004/0053743 A1* | 3/2004 | Tsuzuki | | F16H 59/105 |
| | | | | 477/97 |
| 2007/0144287 A1* | 6/2007 | Kimura | | F16H 61/32 |
| | | | | 74/335 |
| 2008/0051250 A1* | 2/2008 | Inoue | | F16H 61/32 |
| | | | | 477/34 |
| 2008/0173121 A1* | 7/2008 | Kimura | | F16H 61/12 |
| | | | | 74/473.12 |
| 2009/0091866 A1* | 4/2009 | Inoue | | F16H 61/12 |
| | | | | 361/23 |
| 2009/0234530 A1* | 9/2009 | Takamatsu | | F16H 61/12 |
| | | | | 701/31.4 |
| 2010/0161187 A1* | 6/2010 | Ito | | F16H 61/32 |
| | | | | 701/58 |
| 2010/0251846 A1* | 10/2010 | Pick | | F16H 63/48 |
| | | | | 74/473.12 |
| 2013/0006486 A1* | 1/2013 | Shimizu | | F16H 61/12 |
| | | | | 701/51 |
| 2013/0110365 A1* | 5/2013 | Kimura | | F16H 61/32 |
| | | | | 701/65 |
| 2015/0142283 A1* | 5/2015 | Ono | | F16H 61/32 |
| | | | | 701/60 |
| 2017/0241544 A1* | 8/2017 | Terai | | F16H 63/48 |
| 2018/0283545 A1* | 10/2018 | Yamada | | F16H 61/32 |
| 2020/0325986 A1* | 10/2020 | Sakaguchi | | F16H 61/32 |

FOREIGN PATENT DOCUMENTS

| | | |
|---|---|---|
| JP | 2009112151 A | 5/2009 |
| JP | 4535174 B2 | 9/2010 |
| JP | 4766955 B2 | 9/2011 |
| JP | 2015010640 A | 1/2015 |
| JP | 5811507 B2 | 11/2015 |
| JP | 6610633 B2 | 11/2019 |
| KR | 100680835 B1 | 2/2007 |
| KR | 101957508 B1 | 3/2019 |
| KR | 1019057513 B1 | 3/2019 |
| KR | 20190041806 A | 4/2019 |
| KR | 101988749 B1 | 6/2019 |

* cited by examiner

CONTROLLING APPARATUS AND METHOD FOR ELECTRIC SHIFT-BY-WIRE SYSTEM

CROSS REFERENCE TO RELATED APPLICATIONS

The present application claims priority to Korean Patent Application No. 10-2019-0166492 filed Dec. 13, 2019, the entire contents of which is incorporated herein for all purposes by this reference.

BACKGROUND OF THE INVENTION

Field of the Invention

The present disclosure relates to a controlling apparatus and method for an electric shift-by-wire system and, more specifically, to a controlling apparatus and method for an electric shift-by-wire system, the apparatus and method being configured to be capable of preventing the P stage from being released differently from a driver's intention after engagement into the P stage.

Description of the Related Art

Unlike a mechanical shift lever system that uses a mechanical link structure such as a wire, an electric shift-by-wire system performs shifting using an electric signal. Specifically, since the electric shift-by-wire system is configured to transmit shift lever operation information as an electric signal to rotate an electric motor, thereby switching a shift stage and has a small shift shock and vibration, the number of vehicles adopting the electric shift-by-wire system is gradually increasing.

The electric shift-by-wire system performs shifting using a detent spring and a detent plate connected to a motor. Specifically, when the motor is rotated, the detent plate connected to the motor also rotates along with the motor, and the detent spring moves from one root fillet to another formed in the detent plate, whereby the shift is performed. In particular, when the target shift stage is the P stage (parking stage), a parking rod connected to the detent plate causes a parking sprag to be engaged with the parking gear, thereby limiting the rotation of the wheel.

However, when structural defects occur, such as when the detent plate is assembled in a misaligned state, or is misaligned due to a shock generated after assembly, and so on, the detent spring may not be correctly seated at a root fillet of the detent plate. Herein, the detent plate may rotate due to an elastic force of the detent spring to find the root fillet.

In addition, when the target shift stage is the P stage, a butting phenomenon may occur in which the parking sprag is not accurately engaged with the parking gear but is in contact with the tooth portion of the parking gear. Herein, the detent plate can also rotate due to force acting from the parking rod to the detent plate.

The rotation of the detent plate as described above may cause a problem of changing the shift stage differently from the driver's intention. In particular, when the target shift stage is the P stage, the vehicle rolling occurs while releasing from the P stage, whereby there is a risk of a safety accident.

SUMMARY OF THE INVENTION

The present disclosure has been made to solve the above problems, and it is an objective of the present disclosure to provide a controlling apparatus and method for an electric shift-by-wire system, the apparatus and method being configured to be capable of preventing the P stage from being released differently from a driver's intention in the electric shift-by-wire system.

However, the objective of the present disclosure is not limited thereto, and may be variously expanded within a range not departing from the spirit and scope of the present disclosure.

In order to achieve the above objective, a controlling apparatus for an electric shift-by-wire system that changes a shift stage by rotating a motor according to an operation of a shift lever, the system including a shift stage sensor detecting information on a target shift stage according to the operation of the shift lever; a position sensor detecting information on a position of the motor; and a controller configured to receive the detected information from the shift stage sensor and the position sensor, when the target shift stage is a P stage, determine whether the P stage is likely to be released using the position information of the motor, and when it is determined that the P stage is likely to be released, limit rotation of the motor.

In an embodiment, the motor may be a switched reluctance (SR) motor, and the controller may limit the rotation of the motor by applying 2-phase energization to the motor.

In an embodiment, the controller may include a data receiver receiving the detected information from the shift stage sensor and the position sensor; a determination unit determining whether the P stage is likely to be released using the position information of the motor when the target shift stage is the P stage; and a limiting unit limiting the rotation of the motor when it is determined that the P stage is likely to be released.

In an embodiment, the determination unit may store, as a reference position, the position of the motor at a time point when shifting to the P stage is completed, and determine that the P stage is likely to be released when an amount of change in the position of the motor with respect to the reference position is greater than or equal to a predetermined value.

In an embodiment, the limiting unit may limit the rotation of the motor, when a time point when the determination unit determines that the P stage is likely to be released is within a predetermined period of time from the time point when shifting to the P stage is completed, and output a failure signal when the time point is after the predetermined period of time.

In an embodiment, the position sensor may detect an absolute rotational position of the motor.

In an embodiment, the position sensor may measure a relative rotation amount of the motor.

In order to achieve the above objective, a controlling method for an electric shift-by-wire system includes monitoring a shift stage state by a controller; when a target shift stage is a P stage, storing, as a reference position, a position of a motor at a time point when shifting to the P stage is completed; monitoring an amount of change in the position of the motor with respect to the reference position; and limiting rotation of the motor when the amount of change in the position of the motor is greater than or equal to a predetermined value.

In an embodiment, the motor may be a switched reluctance (SR) motor, and the limiting of the rotation of the motor may include applying 2-phase energization to the motor.

In an embodiment, the limiting of the rotation of the motor may be performed by limiting the rotation of the motor when the amount of change in the position of the motor is equal to or more than 2%.

In an embodiment, the limiting of the rotation of the motor may include limiting the rotation of the motor when the amount of change in the position of the motor is equal to or greater than the predetermined value within a predetermined period of time from a point time when shifting to the P stage is completed, and outputting a failure signal when the amount of change in the position of the motor is equal to or greater than the predetermined value after the predetermined period of time.

As described above, the controlling apparatus and method for the electric shift-by-wire system according to exemplary embodiments of the present disclosure can prevent the P stage from being released differently from a driver's intention. In particular, because the P stage may be prevented from being released, it is possible to prevent safety accidents caused by the vehicle rolling in advance. In addition, since the control logic is driven only for a predetermined period of time after the P stage engagement is completed, it is possible to solve a problem of battery discharge and identify shift stage failures due to other causes.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Specific structural or functional descriptions in embodiments of the present disclosure disclosed herein are exemplified only for the purpose of describing the embodiments of the present disclosure, and the embodiments of the present disclosure can be implemented in various forms and should not be construed as being limited to the embodiments described in the specification.

Since the present disclosure can apply various changes and have various forms, specific embodiments will be illustrated in the drawings and described in detail in the description. However, it is to be understood that the description is not intended to limit the present disclosure to a specific form of disclosure, but includes all changes, equivalents, and substitutes included in the spirit and scope of the present disclosure.

Although terms such as first and second may be used to describe various elements, the components should not be limited by the terms. The terms may be used for the purpose of distinguishing one component from another component. For example, without departing from the scope of the present disclosure, a first component may be referred to as a second component, and similarly, the second component may also be referred to as the first component.

It should be understood that, when a constituent element is referred to as being "coupled to" or "connected to" a different constituent element, this means that the constituent element may be coupled to or connected to the different constituent element or means that an intervening constituent element may be present therebetween. In contrast, it should be understood that, when a constituent element is referred to as being "directly coupled to" or "directly connected to" a different constituent element, this means that no intervening constituent element is present therebetween. Expressions describing a relationship between constituent elements, such as "between" and "directly between", and "adjacent to" and "directly adjacent to", should be construed in the same manner.

The terms used in the present specification are only used to describe specific embodiments, and are not intended to limit the present disclosure. Singular expressions include plural expressions unless the context clearly indicates otherwise. In the present specification, it is to be understood that terms such as "comprise" or "have" are intended to designate the existence of the specified features, numbers, steps, actions, components, parts, or combinations thereof, and the possibility of the presence or addition of one or more other features or numbers, steps, actions, elements, parts, or combinations thereof is not preliminarily excluded.

Unless otherwise defined, all terms used herein, including technical or scientific terms, have the same meaning as commonly understood by one of ordinary skill in the art to which the present disclosure belongs. Terms such as those defined in commonly used dictionaries should be interpreted as having a meaning consistent with the meaning in the context of the related art, and unless explicitly defined in the present specification, the terms should not be interpreted in an ideal or excessively formal meaning.

Hereinafter, preferred embodiments of the present disclosure will be described in more detail with reference to the accompanying drawings. The same reference numerals are used for the same elements in the drawings, and duplicate descriptions for the same elements are omitted.

First, an electric shift-by-wire system will be described with reference to FIGS. 1 to 3.

Figure 1:
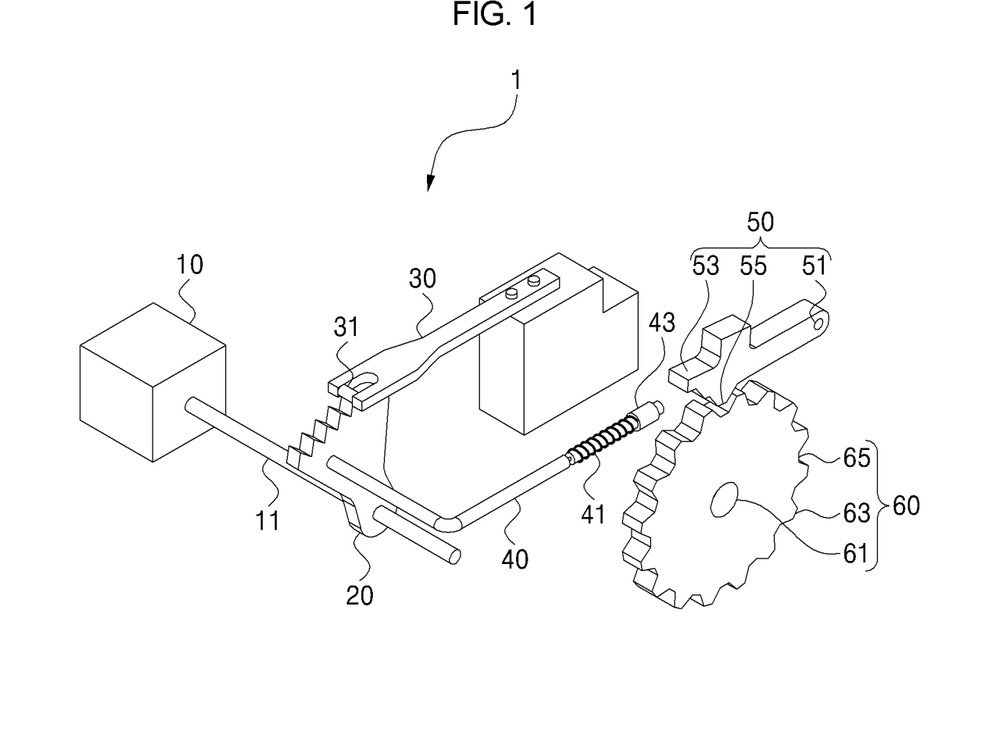
FIG. 1 is a perspective view showing an electric shift-by-wire system.

FIG. 1 is a perspective view illustrating an electric shift-by-wire system. FIG. 2 is a view illustrating a detent plate, a detent spring, and a parking rod of FIG. 1. FIG. 3 is a diagram illustrating a state in which the P stage is selected in FIG. 1.

Figure 2:
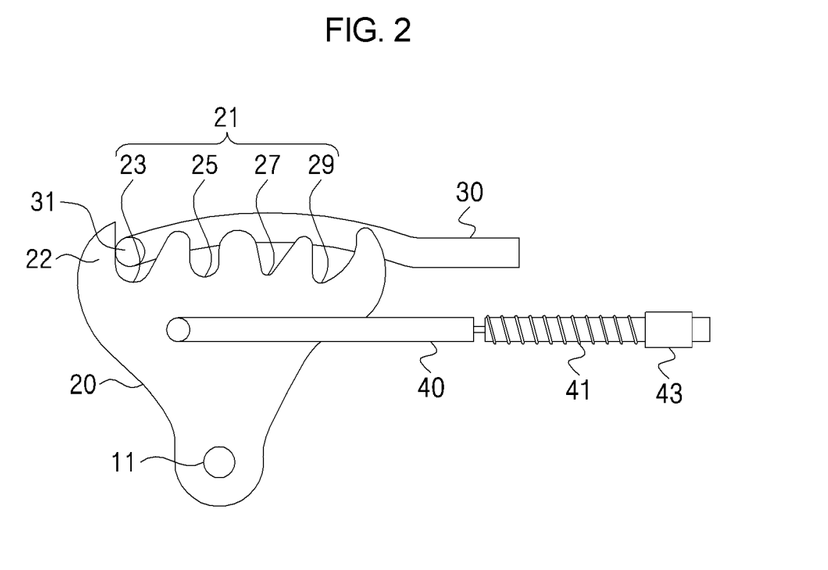
FIG. 2 is a diagram illustrating a detent plate, a detent spring, and a parking rod of FIG. 1.
Figure 3:
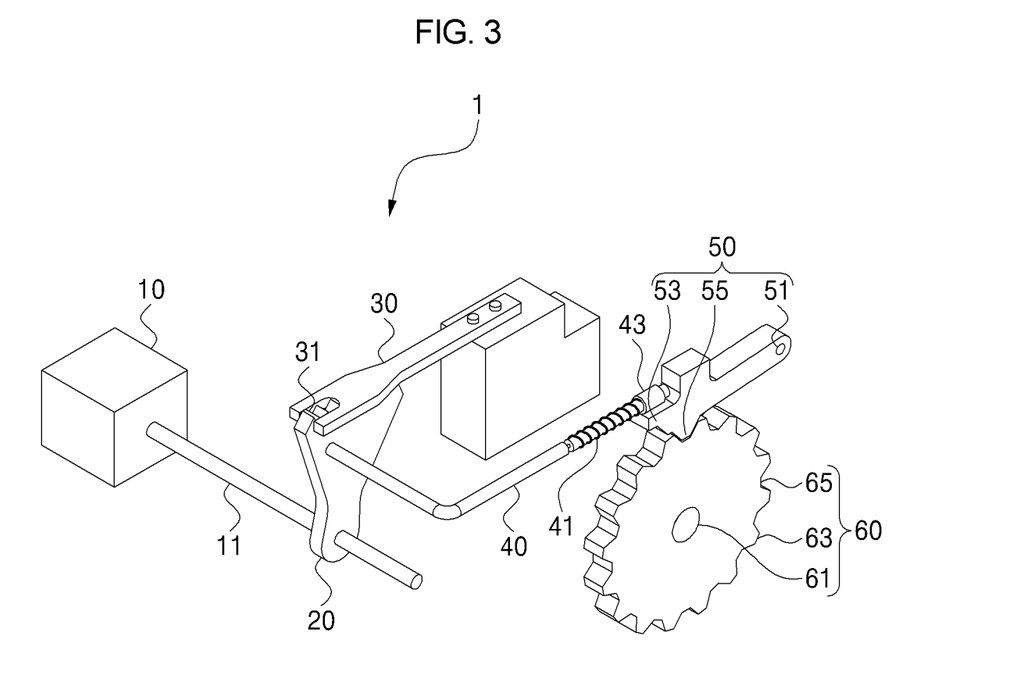
FIG. 3 is a diagram illustrating a state in which the P stage is selected in FIG. 1.

Referring to FIGS. 1 to 3, the electric shift-by-wire system 1 includes a motor 10 that controls a shift stage, a detent plate 20 and a detent spring 30 that switches the shift stage according to the driving of the motor 10, and a parking rod 40 that limits rolling of the wheel when shifting to the P stage.

When the driver operates the shift lever 70 (FIG. 5) to a specific position, an electric signal corresponding to the operated position may be transmitted to the motor 10. The motor 10 may rotate in a forward direction or a reverse direction according to the received electric signal.

The detent plate 20 may be connected to the motor 10 through the rotation shaft 11. Accordingly, the rotation of the motor 10 may be transmitted to the detent plate 20, and as the motor 10 rotates, the detent plate 20 may also rotate.

As shown in FIG. 2, the detent plate 20 may have a root fillet 21 and a top land 22. The root fillet 21 is a position where a roller 31 of the detent spring 30 is seated, and a specific shift stage may correspond to each root fillet 21. Therefore, the shift stage may be switched when the roller 31 moves from one root fillet to another root fillet.

For example, the detent plate 20 may have four root fillets 21. The first root fillet 23 may correspond to a P stage, the second root fillet 25 may correspond to an R stage, the third root fillet 27 may correspond to an N stage, and the fourth root fillet 29 may correspond to a D stage. When the driver operates the shift lever 70 from the R stage to the D stage, the motor 10 and the detent plate 20 rotate, and the roller 31 may move from the second root fillet 25 to the fourth root fillet 29.

Meanwhile, although the detent plate 20 having four root fillets 21 is shown in FIG. 2, the present disclosure is not limited to being applied only to a four-stage detent plate 20. For example, when the detent plate has only two root fillets, corresponding to a P stage and a Not P stage, the present disclosure may be applied in the same way. That is, the present disclosure may be applied to any electric shift-by-wire system having a P stage.

The detent spring 30 is a plate-shaped elastic member having an elastic force, and is configured in such a manner as to have a roller 31 provided at one end and to be fixed at the other end. The roller 31 may move along the root fillet 21 and the top land 22 of the detent plate 20.

Meanwhile, since the detent spring 30 is an elastic member and thus has an elastic restoring force, the elastic restoring force may have a minimum value when the roller 31 is accurately seated at the root fillet 21, and have a maximum value when the roller 31 is located at the top land 22. Therefore, when the roller 31 is not correctly seated at the root fillet 21, an elastic restoring force is acted to allow the roller 31 to be moved toward the root fillet 21, and thus this force may rotate the detent plate 20.

One end of the parking rod 40 is connected to the detent plate 20, and the other end thereof is provided with a parking spring 41 and a cam 43.

The parking spring 41 may be an elastic member having an elastic force. When shifting from the Not P stage to the P stage, that is, as the detent plate 20 rotates clockwise with reference to FIG. 2, the parking spring 41 may be strongly compressed. The compressed parking spring 41 may move the cam 43, so that a parking sprag 50 is engaged with a parking gear 60. Herein, the parking sprag 50 and the parking gear 60 may be configured so that rolling of the wheel is prevented in the P stage. That is, when the target shift stage is the P stage, the parking rod 40 allows the parking sprag 50 to be engaged with the parking gear 60, thereby limiting the rotation of the parking gear 60 and limiting the rotation of the wheel connected to the parking gear 60 through an output shaft 61.

Specifically, the parking sprag 50 is configured so that a free end 53 of one end is rotatable with respect to a rotation shaft 51 of the other end and a locking portion 55 is coupled to the parking gear 60. The parking gear 60 is connected to a wheel (not shown) through an output shaft 61, and may have a plurality of teeth 63 and a plurality of concave portions 65. When the locking portion 55 of the parking sprag 50 is coupled to the concave portion 65 of the parking gear 60, the rotation of the parking gear 60 may be limited, and the rotation of the wheel may be also limited. To the contrary, when the locking portion 55 of the parking sprag 50 is not coupled to the concave portion 65 of the parking gear 60, the output shaft 61 and the wheel may be rotated.

As shown in FIG. 3, when the target shift stage is the P stage, as the detent plate 20 rotates, the parking rod 40 advances toward the parking sprag 50, and the cam 43 of the parking rod 40 presses the free end 53 of the parking sprag 50. Accordingly, the locking portion 55 of the parking sprag 50 is coupled to the concave portion 65 of the parking gear 60, the rotation of the parking gear 60 may be limited.

However, when structural defects occur, such as when the detent plate 20 is assembled in a misaligned state, or misaligned due to a shock generated after assembly, and so on, a butting phenomenon may occur in which the locking portion 55 of the parking sprag 50 is in contact with the teeth 63 instead of the concave portion 65 in the parking gear 60. Herein, an elastic force of the parking spring 41 that has not been resolved may act on the detent plate 20. In addition, there is a high possibility that the roller 31 of the detent spring 30 is not correctly seated at the root fillet 21 of the detent plate 20. Accordingly, a force for allowing the roller 31 to be moved to the root fillet 21 may act on the detent plate 20. The detent plate 20 rotates by such two forces so that in some cases the P stage may be released. A controlling method for solving such a situation in the related art is shown in FIG. 4.

Figure 4A:
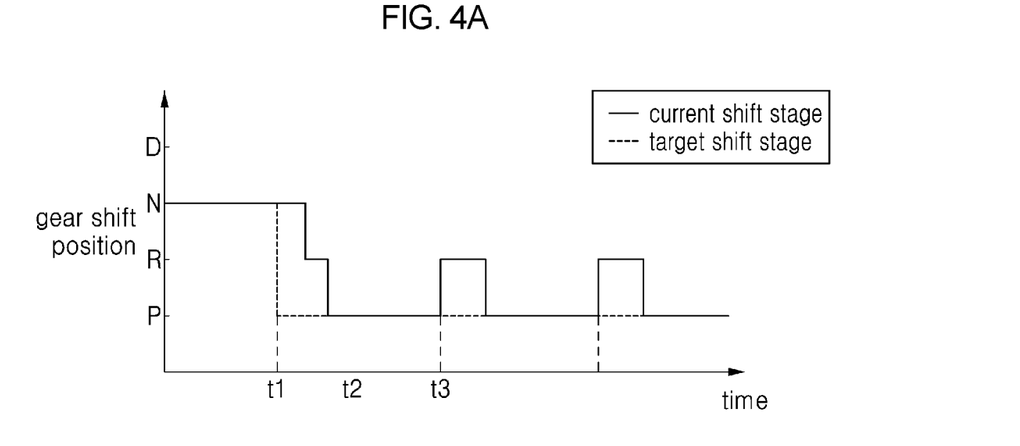
FIG. 4A, FIG. 4B, and FIG. 4C are graphs illustrating a change of a shift stage after engagement into the P stage.
Figure 4B:
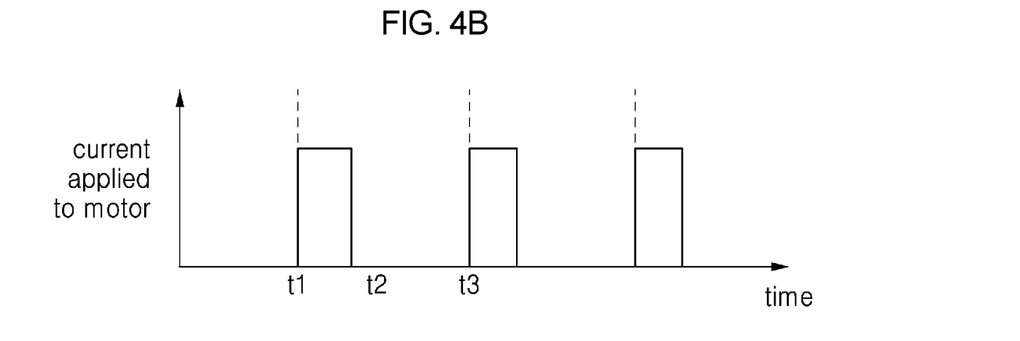
Figure 4C:
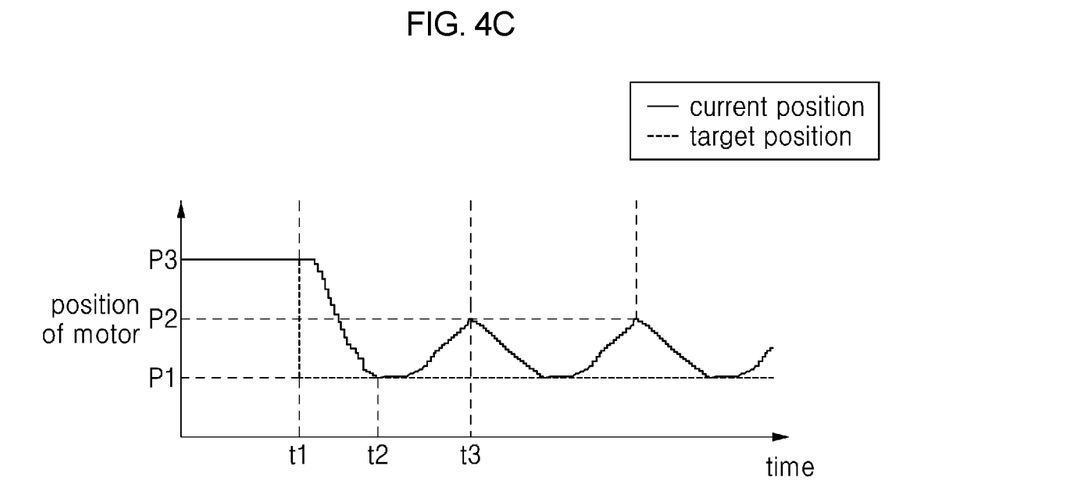

FIG. 4 is a graph illustrating a change in a shift stage after engagement into the P stage. Specifically, (a) in FIG. 4 is a graph illustrating a change in a gear shift position over time, (b) in FIG. 4 is a graph illustrating a change in the magnitude of the current applied to the motor 10 over time, and (c) in FIG. 4 is a graph illustrating a change in the position of the motor over time.

First, the driver operates the shift lever 70 to set the P stage as the target shift stage at a first time point t1. Herein, a current is applied to the motor 10, so that the motor 10 and the detent plate 20 are rotated. Accordingly, the roller 31 of the detent spring 30 moves toward the first root fillet 23 of the detent plate 20, and shifting to the P stage may be completed at the second time point t2.

However, when there is a structural defect in the electric shift-by-wire system 1, a restoring force caused by the detent spring 30 and the parking spring 41 may rotate the detent plate 20 in a direction in which the P stage is released. This phenomenon occurs between the second time point t2 and the third time point t3, and the shift stage may be changed from the P stage to the R stage at the third time point t3. Herein, there is a risk of a safety accident due to the occurrence of vehicle rolling.

According to the related art as described above, the shift stage state should be continuously monitored even after parking (P stage shifting) as shown in FIG. 4, and when the P stage is released, the motor 10 should be driven to switch the shift stage back to the P stage. However, it may take as long as a few days to drive the vehicle again after parking. Accordingly, when continuously monitoring the state of the shift stage while driving the motor for several days, it may cause a problem of battery discharge. In addition, since the shift stage is shifted to the P stage only after being changed to any stage, there is a risk of a safety accident due to the vehicle rolling in the meantime of change.

To solve this problem, according to the present disclosure, the P stage is prevented from being released through control performed within a predetermined period of time after parking, thereby preventing a safety accident. Hereinafter, the present disclosure will be described in more detail with reference to FIGS. 5 to 7.

Figure 5:
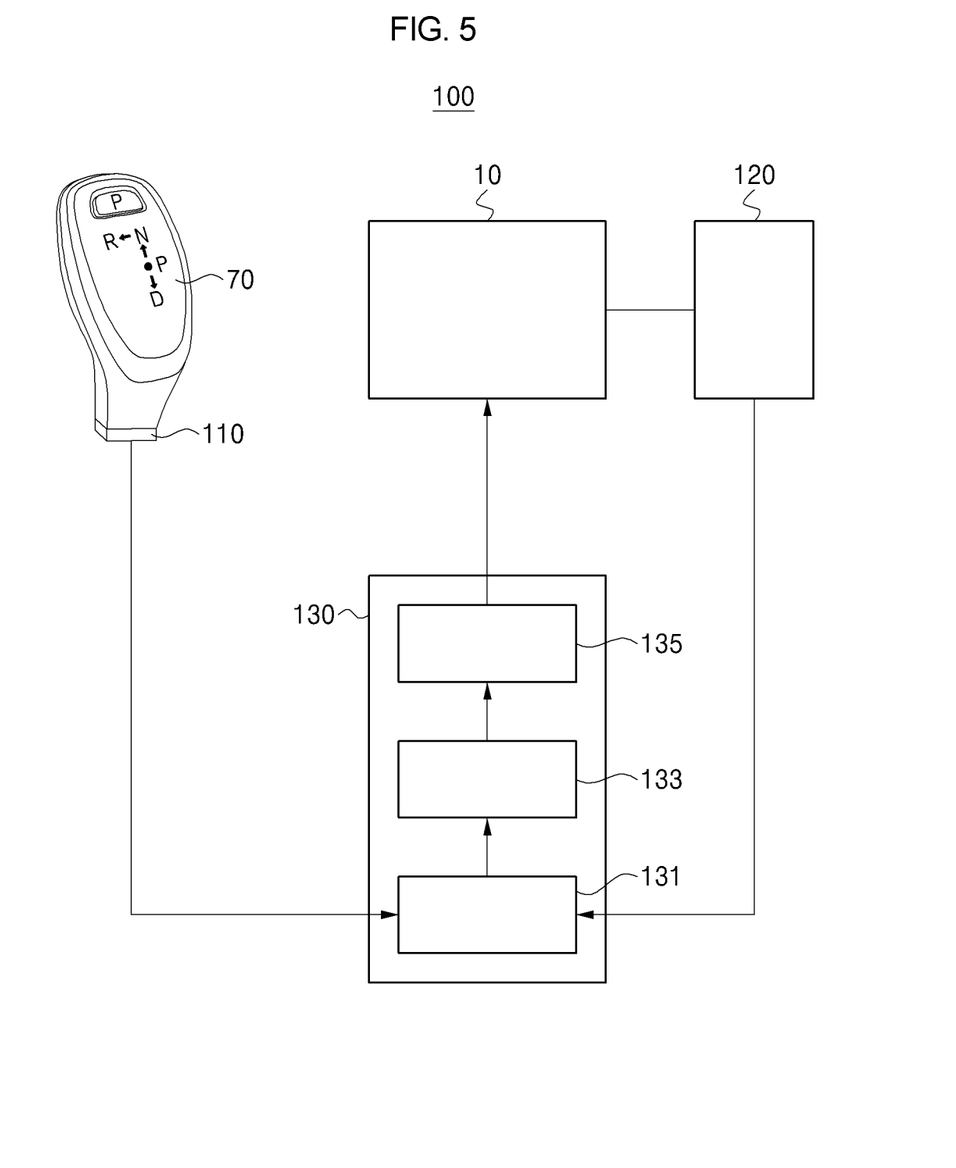
FIG. 5 is a diagram illustrating a controlling apparatus for an electric shift-by-wire system according to the present disclosure.

First, referring to FIG. 5, the controlling apparatus 100 for the electric shift-by-wire system includes a shift stage sensor 110 that detects shift stage information, a position sensor 120 that detects position information of the motor 10, and a controller 130 that determines whether the P stage is likely to be released using the information detected by the sensors 110 and 120 and limits the rotation of the motor 10 when it is determined that the P stage is likely to be released.

The shift stage sensor 110 detects the driver's operation of the shift lever 70 to identify the target shift stage information desired by the driver, and generates an electric signal for the target shift stage information to transmit the same to the controller 130. For example, when the driver operates the shift lever 70 to the "P" position, the shift stage sensor 110 may detect a change in the position of the shift lever 70 and transmit, to the controller 130, information on what the target shift stage is the P stage.

The position sensor 120 may detect the current position of the motor 10 and transmit information on the position of the motor 10 to the controller 130. The controller 130 may determine whether the P stage is likely to be released using the received position information of the motor 10.

According to an embodiment, the "position of the motor 10" detected by the position sensor 120 may mean an absolute rotational position of the motor 10. For example, as shown in FIG. 4, the motor 10 may be located at the first point P1 in the P stage, the motor 10 may be located at the second point P2 in the R stage, and the motor 10 may be located at the third point P3 in the N stage. In this case, the position sensor 120 may detect the current position of the motor 10, and the controller 130 determines whether the P stage is likely to be released by comparing the detected absolute position of the current motor 10 and the pre-stored absolute position of the motor 10 in the P stage. Herein, the position sensor 120 may be, for example, an inhibitor switch.

Alternatively, the "position of the motor 10" detected by the position sensor 120 may mean a relative rotation amount of the motor 10. Specifically, the controller 130 stores the rotation angle of the motor 10 as a reference angle at a time point when the P stage engagement is completed, and then monitors whether the motor 10 further rotates at the reference angle, thereby determining whether the P stage is likely to be released. In this case, the position sensor 120 may be, for example, a Hall sensor.

Meanwhile, since the motor 10 is connected to the detent plate 20 through the rotation shaft 11, a change in position of the motor 10 may be the same as or has a proportional relation with a change in the position of the detent plate 20. That is, even when the location information of the detent plate 20 is used instead of the location information of the motor 10, it is possible to determine whether the P stage is likely to be released. Therefore, the controlling apparatus 100 for the electric shift-by-wire system may have a second position sensor (not shown) that detects the position of the detent plate 20, instead of the position sensor 120 that detects the position of the motor 10. Herein, the controller 130 determines whether the P stage is likely to be released by using the position information of the detent plate 20 received from the second position sensor.

That is, the controlling apparatus 100 for the electric shift-by-wire system according to the present disclosure may selectively have a position sensor 120 that detects the position of the motor 10 or a second position sensor that detects the position of the detent plate 20. In addition, the position sensor 120 may be a sensor that detects an absolute rotation position of the motor 10 or a sensor that measures a relative rotation angle of the motor 10. Hereinafter, for convenience of description, it will be described only on a case where the controlling apparatus 100 for the electric shift-by-wire system has a position sensor 120 that detects the position of the motor 10, and the position sensor 120 is a sensor that detects the absolute rotation position of the motor.

The controller 130 receives information detected by the sensors 110 and 120, and when the P stage set to the target shift stage is likely to be released, limits the rotation of the motor 10 to prevent the P stage from being released.

Specifically, the controller 130 may include a data receiving unit 131 that receives information detected from the shift stage sensor 110 and the position sensor 120, a determination unit 133 that determines whether the P stage is likely to be released using the position information of the motor 10 when the target shift stage is the P stage, and a limiting unit 135 that limits the rotation of the motor 10 when it is determined that the P stage is likely to be released, The data receiving unit 131 may receive target shift stage information from the shift stage sensor 110 and receive current position information of the motor 10 from the position sensor 120.

When the target shift stage is the P stage, the determination unit 133 determines whether the P stage is likely to be released by comparing the current position of the motor 10 with the reference position.

According to an embodiment, the reference position may be the position of the motor 10 in the P stage, which is previously stored in an electronic control unit (ECU) or the like.

Alternatively, the reference position may be the position of the motor 10 measured at a time point when shifting to the P stage is completed. That is, the position of the motor 10 may be detected at the time point when shifting to the P stage is completed, and the detected position of the motor 10 may be used as a reference position. Herein, since the fixed reference value stored in the ECU is not used, it is possible to remove the influence of errors that may occur during the manufacturing step or assembly step, thereby improving the accuracy of determining whether the P stage is likely to be released.

Meanwhile, when an amount of change in the position of the motor 10 relative to the reference position is equal to or more than a predetermined value, the determination unit 133 may determine that the P stage is likely to be released. For example, the predetermined value may be 2% of the reference position. That is, when the motor 10 rotates by an amount equal to or more than 2% of the reference position from the reference position, it may be determined that the P stage is likely to be released. The predetermined value may be appropriately selected as necessary.

When it is determined that the P stage is likely to be released, the limiting unit 135 may force the motor 10 not to move, so that the motor 10 does not rotate any further. Accordingly, it is possible to relieve the force for allowing the motor 10 and the detent plate 20 to be rotated, thereby preventing the P stage from being released.

According to an embodiment, the motor 10 is a switched reluctance (SR) motor, and the limiting unit 135 may limit the rotation of the SR motor by applying 2-phase energization to the SR motor.

Specifically, the SR motor is a motor that uses a ferromagnetic material, such as iron, as a rotor, instead of a magnet, and forms a rotating magnetic field by switching voltage across a coil wound around a stator. Since the rotor is not a magnet, the SR motor does not generate counter electromotive force and has the advantage of low price. Meanwhile, when the SR motor applies current to only two phase of three phases (u-phase, v-phase, w-phase), there is a characteristic that the motor cannot rotate and is fixed.

Accordingly, the limiting unit 135 may force the SR motor not to rotate by applying two phase current to the SR motor, and relieve the force for allowing the motor 10 and the detent plate 20 to be rotated by limiting the rotation of the motor 10 for a predetermined period of time. Accordingly, it is possible to prevent the P stage from being released.

Meanwhile, when the rotational force is generated in the motor 10 and the detent plate 20 even though the limiting unit 135 removes the rotational force of the motor 10, that is, when it is still determined that the P stage is likely to be released, this may be due to causes other than the detent spring 30 or the parking spring 41. Accordingly, the controller 130 prevents the P stage from being released only for a predetermined period of time from the time point when shifting to the P stage is completed or limits the rotation of the motor 10 only a predetermined number of times, and then output a failure signal.

For example, the controller 130 may prevent the P stage from being released by limiting the rotation of the motor 10 only up to 350 ms after shifting to the P stage is completed, and when it is still determined that the P stage is likely to be released after that time has elapsed, output a failure signal to the ECU. Alternatively, the controller 130 may limit the rotation of the motor 10 twice, and when it is still determined that the P stage is likely to be released after that, output a failure signal to the ECU.

The ECU receiving the failure signal may perform failure registration and stop control of the motor 10, by using a failure determination logic.

As described above, the controlling apparatus 100 for the electric shift-by-wire system according to the present disclosure can prevent the P stage from being released differently from the driver's intention. In particular, it is possible to prevent the P stage from being released, thereby fundamentally preventing safety accidents caused due to the vehicle rolling. In addition, since the control logic is driven only for a predetermined period of time after engagement into the P stage, it is possible to solve a problem of battery discharge and identify a failure of shift stage due to other causes.

Hereinafter, a control logic that prevents the P stage from being released using the controlling apparatus 100 for the electric shift-by-wire system will be described in more detail.

Figure 6:
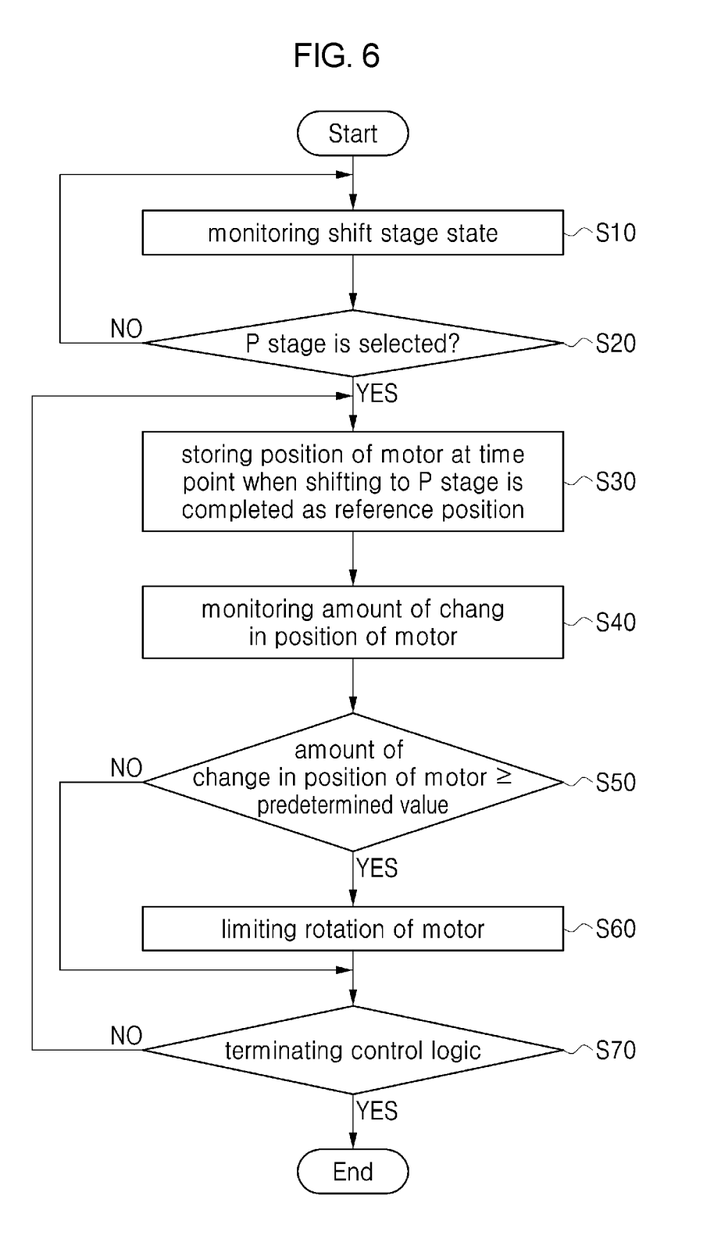
FIG. 6 is a flow chart illustrating a controlling method for an electric shift-by-wire system using the controlling apparatus of FIG. 5.
Figure 7A:
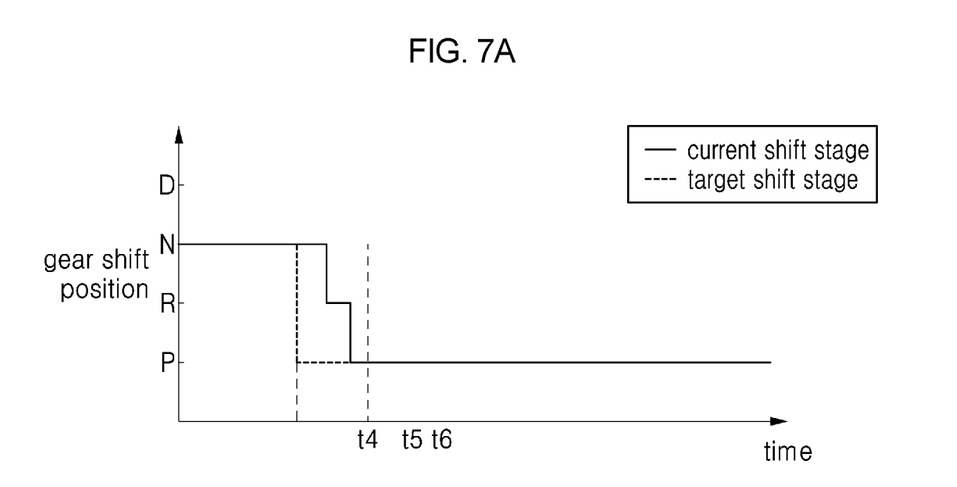
FIG. 7A, FIG. 7B, and FIG. 7C are graphs illustrating a change in a shift stage after engagement into the P stage when the controlling apparatus of FIG. 5 is used.
Figure 7B:
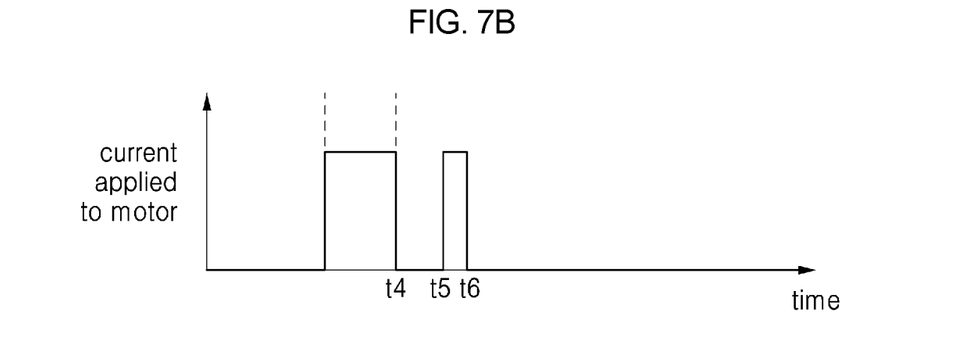
Figure 7C:
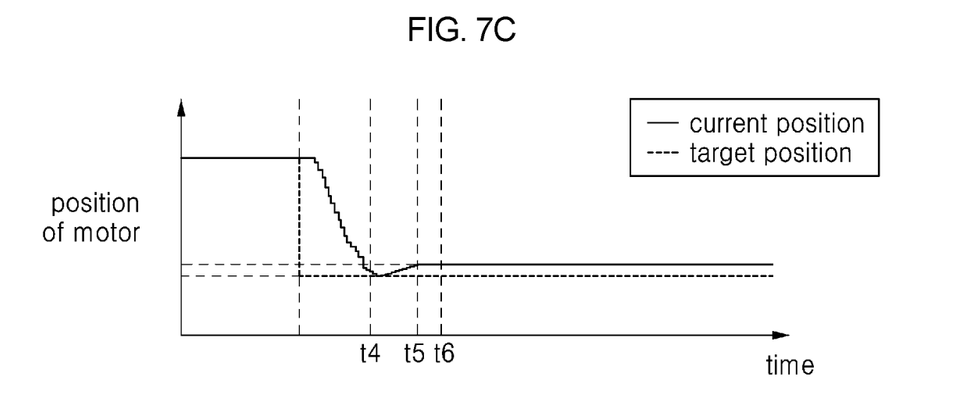

FIG. 6 is a flow chart illustrating a method of controlling an electric shift-by-wire system using the controlling apparatus of FIG. 5, and FIG. 7 is a graph illustrating a change in a shift stage after engagement into the P stage.

Referring to FIGS. 6 and 7, a shift stage state is monitored first (S10). Herein, monitoring the shift stage state may be performed by allowing the shift stage sensor 110 to detect the movement of the shift lever 70.

When the P stage is selected as the target shift stage (S20), the position of the motor 10 at the time point when shifting to the P stage is completed is stored as a reference position (S30).

The time point when shifting to the P stage is completed means a time point when the motor 10 and the detent plate 20 do not rotate any further, and is referred to as a fourth time point t4 in FIG. 7.

The reference position refers to a reference value for determining whether the P stage is likely to be released. Meanwhile, the position of the motor 10 at the time point when shifting is completed is not used as the reference position, but the position of the motor 10 in the P stage previously stored in the ECU or the like may be used as the reference position, which have been described earlier.

Thereafter, an amount of change in the position of the motor 10 is monitored (S40), and it is determined whether the P stage is likely to be released (S50).

Specifically, when the amount of change in the position of the motor 10 relative to the stored reference position is equal to or more than a predetermined value, it may be determined that the P stage is likely to be released. Herein, the predetermined value may be appropriately selected as needed. For example, when the motor 10 rotates by an amount equal to or more than 2% of the reference position from the reference position, it may be determined that the P stage is likely to be released.

When it is determined that the P stage is likely to be released, the rotation of the motor 10 is forcibly limited (S60) for a predetermined period of time.

For example, when the motor 10 is an SR motor, it is possible to forcibly limit the rotation of the motor 10 by applying 2-phase energization to the motor 10.

Such limitation of rotation of the motor 10 is to relieve forces for allowing the motor 10 and the detent plate 20 to be rotated and is just needed to be carried out for a time required for the forces to be resolved. Herein, the required time may be appropriately selected through specifications or experiments of the electric shift-by-wire system. In FIG. 7, it is shown to limit the rotation of the motor 10 between the fifth time point t5 and the sixth time point t6.

Meanwhile, when it is determined that the P stage is likely to be released again after the rotation of the motor 10 is limited as described above, the rotation of the motor 10 may be additionally limited.

For example, when the motor 10 rotates by an amount equal to or more than 2% of the reference position at a time point when the P stage engagement is completed, the first rotation limit of the motor 10 may be performed. After performing the first rotation limit, the position of the motor 10 is stored as a new reference position, and when the motor 10 rotates again by an amount equal to or more than 2% of the new reference position, the second rotation limit of the motor 10 may be performed.

When a predetermined amount of time has elapsed from the time point when the P stage engagement is completed, or the number of times the rotation limit of the motor 10 is performed is more than a predetermined number of times, the control logic for preventing the P stage from being released is terminated (S70). This is to identify failures due to other causes.

Therefore, when it is determined that the P stage is likely to be released even after the control logic is terminated (S70), a failure signal is output to the ECU.

As described above, the controlling method for the electric shift-by-wire system according to the present disclosure can prevent the P stage from being released differently from a driver's intention. In particular, because the P stage may be prevented from being released, it is possible to prevent safety accidents caused due to the vehicle rolling in advance. In addition, since the control logic is driven only for a predetermined period of time after the P stage engagement is completed, it is possible to solve a problem of battery discharge and identify shift stage failures due to other causes.

Although the above has been described with reference to embodiments of the present disclosure, it will be appreciated that those skilled in the art will be able to variously modify and change the present disclosure without departing from the spirit and scope of the present disclosure described in the following claims.

The invention claimed is:

1. A controlling apparatus for an electric shift-by-wire system that changes a shift stage by rotating a motor according to an operation of a shift lever, the system comprising:
    a shift stage sensor detecting information on a target shift stage according to the operation of the shift lever;
    a position sensor detecting information on a position of the motor; and
    a controller configured to receive the detected information from the shift stage sensor and the position sensor, when the target shift stage is a P stage, determine whether the P stage is likely to be released using the position information of the motor, and when it is determined that the P stage is likely to be released, limit rotation of the motor.

2. The apparatus of claim 1, wherein the motor is a switched reluctance (SR) motor, and the controller limits the rotation of the motor by applying 2-phase energization to the motor.

3. The apparatus of claim 1, wherein the controller comprises:
    a data receiver receiving the detected information from the shift stage sensor and the position sensor;
    a determination unit determining whether the P stage is likely to be released using the position information of the motor when the target shift stage is the P stage; and
    a limiting unit limiting the rotation of the motor when it is determined that the P stage is likely to be released.

4. The apparatus of claim 3, wherein the determination unit:
    stores, as a reference position, the position of the motor at a time point when shifting to the P stage is completed, and
    determines that the P stage is likely to be released when an amount of change in the position of the motor with respect to the reference position is greater than or equal to a predetermined value.

5. The apparatus of claim 4, wherein the limiting unit:
    limits the rotation of the motor, when a time point when the determination unit determines that the P stage is likely to be released is within a predetermined period of time from the time point when shifting to the P stage is completed, and
    outputs a failure signal when the time point is after the predetermined period of time.

6. The apparatus of claim 1, wherein the position sensor detects an absolute rotational position of the motor.

7. The apparatus of claim 1, wherein the position sensor measures a relative rotation amount of the motor.

8. A controlling method for an electric shift-by-wire system, the method comprising:
    monitoring a shift stage state by a controller;
    when a target shift stage is a P stage, storing, as a reference position, a position of a motor at a time point when shifting to the P stage is completed;
    monitoring an amount of change in the position of the motor with respect to the reference position; and
    limiting rotation of the motor when the amount of change in the position of the motor is greater than or equal to a predetermined value.

9. The method of claim 8, wherein the limiting of the rotation of the motor is performed by limiting the rotation of the motor when the amount of change in the position of the motor is equal to or more than 2%.

10. The method of claim 8, wherein the limiting of the rotation of the motor comprises:
    limiting the rotation of the motor when the amount of change in the position of the motor is equal to or greater than the predetermined value within a predetermined period of time from a point time when shifting to the P stage is completed, and
    outputting a failure signal when the amount of change in the position of the motor is equal to or greater than the predetermined value after the predetermined period of time.

* * * * *